US006490572B2

(12) United States Patent
Akkiraju et al.

(10) Patent No.: US 6,490,572 B2
(45) Date of Patent: *Dec. 3, 2002

(54) OPTIMIZATION PREDICTION FOR INDUSTRIAL PROCESSES

(75) Inventors: Rama Kalyani Tirumala Akkiraju, Ossining, NY (US); Brenda Lynn Dietrich, Yorktown Heights, NY (US); Pinar Keskinocak, Yorktown Heights, NY (US); Seshashayee Sankarshana Murthy, Yorktown Heights, NY (US); John Nathan Rachlin, Tarrytown, NY (US); Frederick Yung-Fung Wu, Cos Cob, CT (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 105 days.

(21) Appl. No.: 09/080,320

(22) Filed: May 15, 1998

(65) Prior Publication Data

US 2001/0013027 A1 Aug. 9, 2001

(51) Int. Cl.[7] .............................. G06F 15/18; G06E 1/00
(52) U.S. Cl. ............................... 706/19; 706/13; 706/21
(58) Field of Search ......................... 706/21, 13, 19

(56) References Cited

U.S. PATENT DOCUMENTS

| | | | | |
|---|---|---|---|---|
| 5,343,554 A | * | 8/1994 | Koza et al. | 706/13 |
| 5,406,477 A | * | 4/1995 | Harhen | 706/10 |
| 5,644,727 A | * | 7/1997 | Atkins | 705/40 |
| 5,742,738 A | * | 4/1998 | Koza et al. | 706/13 |
| 5,963,739 A | * | 10/1999 | Homeier | 717/4 |
| 6,021,402 A | * | 2/2000 | Takriti | 705/412 |
| 6,038,556 A | * | 3/2000 | Hutchinson | 706/19 |
| 6,047,186 A | * | 4/2000 | Yu et al. | 455/446 |

OTHER PUBLICATIONS

Rinaldo et al, "Image Coding by Block Prediction of Multiresolution Subimages", IEEE Transactions on Image Processing, Jul. 1995.*
Christophe Monroca, "Aprobabilistic Approch Which Provides a Modular and a Neural Network Architecture for Discrimination", IEEE Icann, 1993.*
Yoshimoto et al, "Decentralized Hopfield Neural Network Applied to Maintenance, Scheduling of Generating Units in Power Systems", IEEE Icann, 1993.*

(List continued on next page.)

Primary Examiner—George B. Davis
(74) Attorney, Agent, or Firm—Whitham, Curtis & Christofferson, P.C.; Stephen C. Kaufman (57) ABSTRACT

Prediction methods that anticipate the outcome of a detailed optimization step are used in lieu of or in conjunction with actual optimization to improve response time and reduce required computational resources for optimization problems having a hierarchical structure. Decomposition of the optimization problem into sub-problems and sub-sub-problems is, itself, an optimization process which is iteratively performed while preferably guided by prediction of the quality of solutions to the problems into which the "master" optimization problem may be decomposed. Prediction also reduces the requirements for computational resources and allows more decompositions to be examined within the available time in order to arrive at a more nearly optimal decomposition as well as a more nearly optimal solution. Prediction is selectively used when it is determined that such a benefit is probable.

11 Claims, 5 Drawing Sheets

OTHER PUBLICATIONS

Gersht et al, "Real–Time Decentralized Traffic Management using a Para Algorithm" Global Telecommunications Conference, IEEE, Dec. 1990.*

Yang et al, "Evaluation of Parallel Branch–and–Bound Algorithm on a Class of Multiprocessors", IEEE Transactions on Parallel and Distributed Systems, Jan. 1994.

Powel et al, "Human Corps Planning= a first—Order Computational Mode", IEEE Proceeding of the Annual AI Systems in Government Conference, Mar. 1989.

Huang et al, "A Heuristic Prediction Method for Constrained Optimal Control Problems.", IEEE Proceedings of the IEEE Inter. Symposium on Industrial Electronics, May 1992

Li et al, "Stochastic Optimization of Interconnected Multi-reservoir Power Systems", IEEE Transactions on Power System, 1990.

Chang et al, "Large–Scale Convey Optimal Control Problems: Time Decomposition Incentive and Parallel Algorithm" IEEE Transactions on Automatic Control, Jan. 1990.*

* cited by examiner

OPTIMIZATION PREDICTION FOR INDUSTRIAL PROCESSES

BACKGROUND OF THE INVENTION

1. Field of the Invention

The present invention generally relates to optimization of industrial processes such as manufacturing, shipping and the like and, more particularly, to prediction of the outcome of detailed optimization processes or sub-problems contained therein characterized by a hierarchical problem substructure.

2. Description of the Prior Art

Industrial processes require the utilization of equipment, space, time and other economically valuable resources to achieve their objectives. For example, a manufacturing process may require large and expensive machinery and facilities to manufacture and store a commodity (e.g. paper) in bulk which must be further processed (e.g. cut into desired roll widths and diameters and, often, wound on cores of specified dimensions) to satisfy the specifications of a customer order. Similarly, transportation of a commodity from one or more manufacturing sites to locations required by customers may entail management of a fleet of vehicles covering several different modes of transport which represents a substantial capital and economic expense. These and other industrial and manufacturing processes and services (e.g. utilities, power generation and the like) must be performed at near optimal efficiency if maximum return on investment and profitability is to be obtained.

In a typical optimization problem, there is an objective function which characterizes the quality or "goodness" of a particular solution (e.g. the qualitative or quantitative degree to which a particular solution meets the objective). There will also be zero or more constraints which must be satisfied for a particular solution to be deemed valid or feasible. The goal of optimization is to identify a feasible solution to a given problem for which the quality of the solution according to the objective function is maximal (or minimal depending on how the objective function is defined). That is, the goal of optimization is to identify the best solution consistent with meeting a set of constraints.

One method that guarantees that an optimal solution will be generated is to exhaustively consider every possible feasible solution using state-space search techniques such as depth-first or breadth-first search. These method will work if 1) there is a well-defined method that guarantees that all feasible solutions can be generated in a finite number of computing steps, and 2) there are sufficient computational resources (time and storage) to allow for this approach. In general, while developing a well-defined methodology is generally not difficult to achieve, provision of sufficient computational resources makes exhaustive search impractical for all but the most simple optimization problems.

In practice, the solving of optimization problems usually includes an attempt to make use of more efficient methods such as linear programming, integer programming, dynamic programming, greedy algorithm heuristics, hill-climbing (also known as means-end analysis) or other heuristic search techniques. Some search methods may also incorporate some degree of randomization in cases where alternative methods tend towards locally optimal but globally suboptimal solutions. Examples of such techniques are genetic algorithms and simulated annealing. However, there is no guarantee that such techniques will not also suffer from a tendency towards returning locally optimal (but globally sub-optimal) solutions for some problem domains or problem instances within a given domain.

There are also many other limitations to these approaches. For example, a problem can be posed as a linear program only if its constraints and objectives are linear functions. In many difficult problems, the objective function may be highly nonlinear or discontinuous. Some nonlinear optimization problems can be approximated by linear programs if one or more nonlinear components of the problem formulation are left out, or by introducing additional decision variables and constraints to approximate nonlinearities as piece-wise linear functions. Nonlinear objectives may be treated as sub-problems and explored using other aforementioned search techniques.

In summary, practical approaches to complex optimization problems may not guarantee solutions, may require deviation from the preferred characterization of the problem and/or may behave unpredictably. The tendency toward these behaviors increases with the complexity of the optimization problem.

For example, the paper making industry presents some particularly complex problems. When a commercial grade of paper (e.g. other than specialty papers which are sometimes made manually in individual sheets by traditional processes) is initially made, a large, high-capacity machine is used to produce large-width reels, often twenty feet wide or more, the width of which cannot readily be altered. This machine will be capable of producing paper of that width in a number of grades (e.g. newsprint, bond, etc.), weights, finishes and the like from many different compositions of materials (e.g. wood or cloth fiber and mixtures thereof) but only one set of such specifications can be accommodated at any given time.

Therefore, it is advantageous for the manufacturer to fulfill orders with shared product specifications together as part of a batch process in order to avoid the time and material costs associated with altering the specification of the product currently being manufactured. The production of goods having differing specifications must be scheduled including setup time and the time for making transitional product (e.g. having a mixture of constituent compositions between intended compositions) and the risks of other contingencies when specifications are to be changed.

Of course, setups can be readily minimized by combining together all available orders of a common product specification into one batch, but this may not be consistent with satisfying all orders (which may include other product specifications) in a timely fashion. Many other issues pertaining to manufacturing efficiency, profitability, quality and customer satisfaction may influence how manufacturing processes are scheduled.

The paper produced will be formed in a wide continuous sheet of approximately the same width of the web. Some lack of uniformity will occur over a small width at the edges of the wide sheet and the remainder of the width over which the paper quality is uniform is referred to as the "maximum deckle" or, simply "deckle", of the machine. This sheet is wound onto a reel and transported to another large machine where it is unrolled, slit into desired widths and again wound onto rolls of desired dimensions which will be specified in the order.

Product specification is not the only criteria by which orders are to be grouped together. In complex manufacturing environments, there are multiple production stages. The manufacturing process employed at one stage may significantly impact the production efficiency at another stage. For example, in the context of paper manufacturing, the widths into which the paper must be cut to conform to orders may involve substantial waste when the total width of all rolls cut from the original reel are less than the total width of the reel itself. Thus, it is not the individual roll widths that determine the relative amount of waste but the combination of widths for particular grades of paper over a plurality of orders, some of which may be only anticipated, along with the ordered or anticipated quantities required for each width.

Further complications may arise since the paper slitting apparatus may not simultaneously accommodate different core sizes or more than a particular number of slitting mechanisms. The production of combinations of narrow rolls which might be expected to more closely match the maximum deckle will increase the number of rolls made from a reel of paper in a given amount of time and may cause bottlenecks in further roll wrapping operations, roll handling operations, and the like. Therefore it can be seen that these constraints on optimization as well as the optimization process, itself, involves many manipulations for allocation of orders to particular machines (assuming two or more machines having differing maximum deckle are available) and run formation and sequencing (RFS) in which the combination of roll widths/sizes to be slit from a sequence of reels is determined.

From the foregoing, it can be readily appreciated that the scheduling of the machinery for manufacture of reels of paper of particular specifications and the scheduling of slitting machinery together with the possibility of maintaining inventory (which is also subject to optimization) presents a highly complex and discontinuous optimization problem. The optimization problem cannot be readily expressed for the general case (e.g. for a realistic set of groups of actual and anticipated orders of variable number and quantity) and potentially presents the problem of returning local rather than global solutions.

Unfortunately, it is often the case that the sub-problems generated by various decompositions are complex optimization problems in their own right and are computationally expensive to solve. Even if a method is known for deriving an optimal solution, the problem instance may be so large as to require impractical levels of computational resources. In these situations, a fast predictor or estimator of the objective value is useful in order to avoid the cost of complete simulation, search, or optimization.

To solve efficiently, many problems can be decomposed into smaller sub-problems. The sub-problems may have the same or different structure. The process of solving the larger "master" problem becomes one of a) identifying an appropriate partitioning of the master problem into multiple sub-problems, and b) solving each of the sub-problems. In the foregoing discussion, the scheduling of the fulfillment of multiple orders for various products represents the "Master problem". The partitioning problem is to form and sequence batches of a particular product, determine which orders should be fulfilled as part of each batch. Solving each batch involves scheduling the downstream operations implied by the batch.

In this case, identifying an efficient of slicing the reels produced during this batch implies forming rolls that serve to fulfill the requirements of each order in the batch. The formation of batches may need to be altered if the existing batches lead to downstream inefficiencies. In general, the "goodness" of the partitioning derived in step (a) may be dependent upon the quality of the sub-problem solutions found in step (b). Thus one must iterate between the master problem and the sub-problems many times until some level of convergence is obtained. That is, each sub-problem is solved or optimized so as to maximize some objective function specific to the particular sub-problem formulation. The solutions to sub-problems are combined to generate an overall solution to the high level optimization problem and the objective value of the sub-problems may be similarly combined to determine the overall objective value of the higher-level optimization problem. This approach is preferred when the sub-problems can be solved in a highly efficient manner. As the sub-problems become more difficult, iteration rapidly become untenable due to finite computational resources.

The inventors have identified the problems of finding an optimal set of sub-problems wherein the measure of correctness of the objective function for these respective sub-problems is, in and of itself, an optimization problem without necessarily requiring solution to the sub-problems and the computational overhead involved in finding optimal solutions for sub-problems which lead to an optimal or near optimal solution for other than the most rudimentary formulations of sub-problems to be a major obstacle to the efficient solution of realistic complex optimization problems. However, no methodology for avoiding the process of solving individual sub-problems or developing an optimal set of such sub-problems in an efficient manner is currently available.

SUMMARY OF THE INVENTION

It is therefore an object of the present invention to provide a predictive optimizer to enable optimization of the manner in which a complex optimization problem is decomposed for determination of candidate solutions in such a manner as to employ predictor methods that anticipate the outcome of solution-generating optimization methods as a partial or complete substitute for such solution-generating methods.

It is another object of the invention to provide determination of a solution or a plurality of candidate solutions for a complex optimization problem in reduced time and at reduced computational cost and in which the complex optimization problem is decomposed in a variety of ways.

It is a further object of the invention to provide an increased number of candidate solutions to a complex optimization problem corresponding to a plurality of decompositions and including optimization of the decomposition within the time and computational cost suitable for a scheduling system in an industrial or manufacturing environment.

In order to accomplish these and other objects of the invention, a computer implemented optimization method is provided comprising the steps of decomposing an optimization problem into a first plurality of sub-problems, predicting an evaluation of a solution to a sub-problem, evaluating a composed solution of the optimization problem based on an evaluation of a solution or a predicted evaluation for each sub-problem, and repeating the process using a different decomposition to form a second plurality of sub-problems wherein at least one of the sub-problems of the second plurality of sub-problems differs from sub-problems of the first plurality of sub-problems, preferably in a manner dependent on the predicted quality of optimization of a particular sub-problem.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is an illustration of the decomposition of a complex master problem into one or more sub-problems, each of which is then subject to at least one of a sub-problem solver and a sub-problem predictor, FIG. 2 comprises a block diagram defining a possible methodology for creating a predictive method, FIG. 3 comprises a diagram depicting a strategy for combining predictive optimization with detailed optimization, and FIG. 4 comprises a diagram of a sample predictor based on a "neural-network" classifier technique for predicting the outcome of an optimization problem such as the cutting-stock optimization problem, applicable to certain manufacturing scheduling optimization domains, and FIG. 5 comprises a depiction of problem instances mapped to a vector in a multi-dimensional space containing regions that lead to good outcomes and bad outcomes, and that can be used for constructing certain types of prediction methods such as a "nearest-neighbor" classifier technique for predicting the outcome of an optimization problem such as the cutting-stock optimization problem referred to above.

DETAILED DESCRIPTION OF A PREFERRED EMBODIMENT OF THE INVENTION

Figure 1:
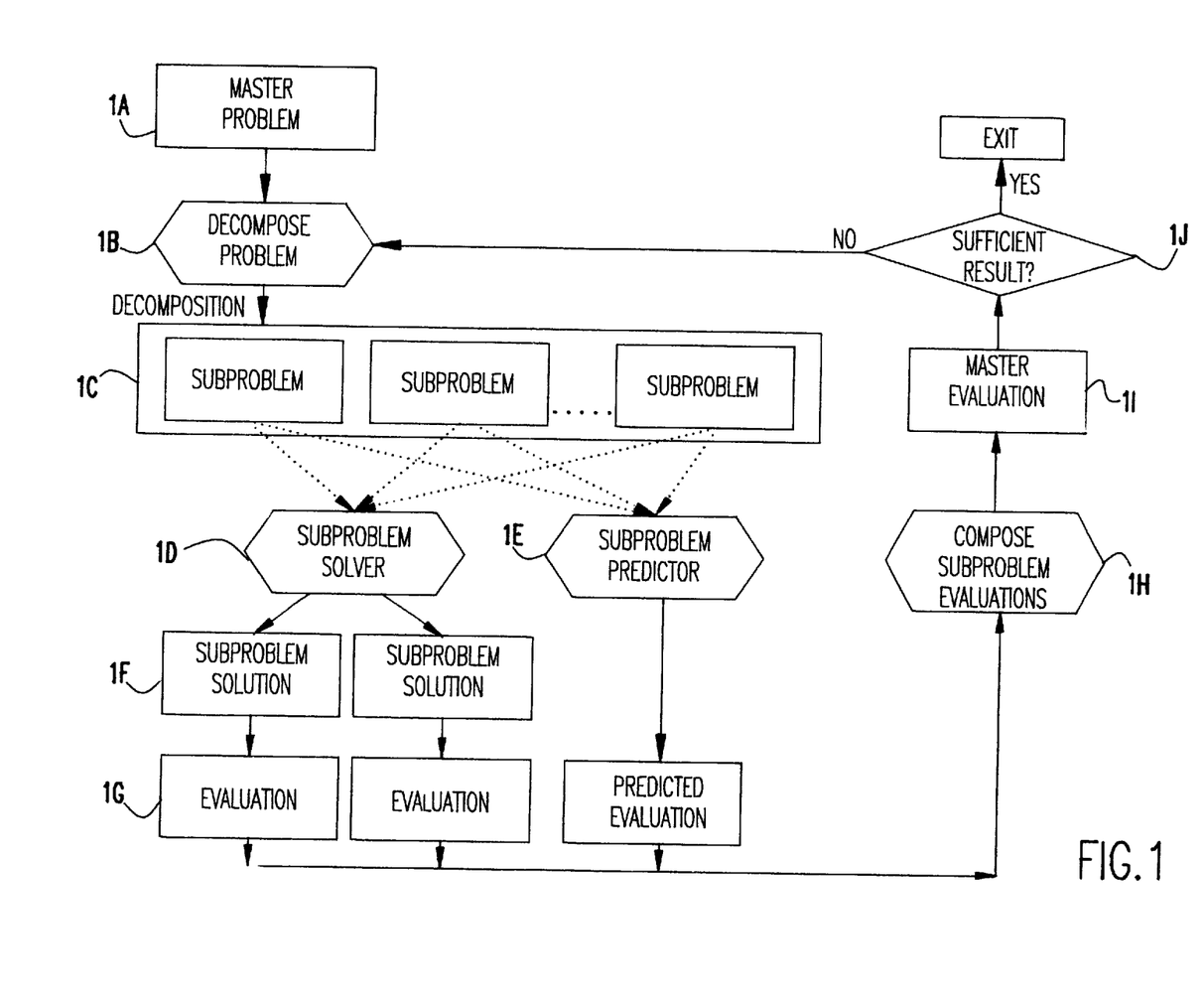

Referring now to the drawings, and more particularly to FIG. 1, there is shown an illustration of the decomposition of a complex optimization problem into one or more sub-problems including feedback for iteration of different decompositions in accordance with the invention. It should be understood that FIG. 1 is presented at a very high level of abstraction and that some superficial similarity to and commonality with known problem decomposition methods will be noted by those skilled in the art. However, as will become apparent from the following discussion, the illustration of FIG. 1 is provided in the interest of conveying an understanding of the invention sufficient to the practice thereof by those skilled in the art and no admission of prior art is made in regard to any portion of FIG. 1.

Further, as used herein, the terminology "predictive optimizer" is intended to refer to an optimization system that combines detailed optimization or exact solution methods with a predictor method that merely anticipates the outcome of an optimization method or exact solution method without performing the optimization itself. The predictor thus serves as a substitute for detailed optimization in accordance with the invention so as to both reduce overall computational resource requirements for portions or the entirety of the optimization problem and, preferably, to serve as a guide for finding a near-optimum decomposition of the high-level optimization problem. In this regard, it should be noted that while prediction is preferably used to guide further decompositions, the time and/or computational resources saved by prediction can be expected to improve the decomposition determined to be most nearly optimal within the time involved even if the search therefor is randomized since more decompositions can be examined within the available time.

As shown in FIG. 1, the predictive optimizer in accordance with the invention is a method of optimization which decomposes a complex problem into one or more parts which can be solved easily and quickly (e.g. by linear programming), and one or more parts that require searching combined with optimization. The method in accordance with the invention further replaces the latter optimization techniques (e.g. searching) with predictive methods that anticipate, estimate or predict the result of a method that generates explicit solutions to a problem through some optimization or search technique, thus enabling the solver to find a good solution of a suitably decomposed high-level optimization problem in a reasonable time and with reduced computational cost and hardware resources.

While avoiding the generation os solutions, predictive methods nevertheless are capable of yielding information that can be used to guide the search for a better solution and/or a more nearly optimal decomposition of the problem. This approach not only reduces computational resources required and improves performance for a given computational resource but allows more possible decompositions of the high-level optimization problem to be considered in the available response time of a problem-solving system.

In general, it takes less time to predict the outcome of an optimization than to actually perform the optimization, depending upon the prediction method used. Predictive optimization may not be as accurate, however. Nevertheless, because a predictor requires fewer computational resources (i.e., is faster) more sub-problem alternatives can be considered. Predictive optimization may thus allow for the identification of a more nearly optimal solution within a fixed amount of time, or alternatively, for the identification of solutions of a given level of quality in less time, or both. In effect, it would be advantageous to search for an optimal high-level solution by finding an optimal set of sub-problems wherein the measure of correctness of the objective function for these respective sub-problems is, in and of itself, an optimization problem. The general methodology of employing predictive methods is, in theory, applicable to any number of levels in a problem hierarchy. That is, the outcome of a sub-problem optimization can be predicted by using search methods to produce sub-sub-problems guided by predictive optimization, and so on.

By having some form of an approximation or approximate solver, this approach could be used when the sub-problems are difficult to solve. An approximate solver or predictor anticipates the results of an optimization based on characteristics of the problem itself. One strategy for incorporating predictive methods is to automatically reject sub-problem formulations that the predictor anticipates will lead to poor results allowing the system to allocate more resources to deriving alternative and possibly better sub-problem formulations. Thus, the evaluation of a given problem decomposition can be made more efficient by predicting the outcome of one or more sub-problems solutions based on attributes of the input sub-problem rather than by carrying out detailed problem solving methods.

Detailed sub-problem solving methods can be reserved for two situations: 1) when the predictor anticipates good results for a sub-problem, in which case the explicit use of a sub-problem solver provides validation for the predictive method, and 2) sub-problems for which the predictor itself is thought to be unreliable based on some prior analysis. Strategies may be formulated for systematically combining detailed optimization with predictive optimization based on the relative behavior of predictive optimization versus detailed optimization methods. These combination strategies might take into account, for example, the relative speed and accuracy of the two methods for different types of input problems.

Generally, in accordance with the invention, detailed optimization methods may be applied to some or all of the optimization sub-problems or their sub-problems (e.g. sub-sub-problems). (In this regard, the invention determines when detailed problem solving should be applied to all portions into which the "master" optimization problem has been decomposed.) Predictive optimization methods that predict the outcome of the detailed optimization method may, similarly, be applied by the invention to some or all of the optimization sub-problems or their sub-problems. Thus, in accordance with the invention, solutions to the high-level optimization level may be produced with fewer computational resources by substituting computationally inexpensive predictive methods for computationally expensive optimization methods.

FIG. 1 depicts a scenario in which an optimization problem 1a is broken down by a decomposer 1b, into sub-problems 1c. The details of decomposer 1b are not critical to the practice of the invention but, in general, the decomposer should be able to discriminate portions of the optimization problem which correspond to known, easily solvable optimization problems (e.g. combinations of linear functions) from those portions of the optimization function which are not. Pattern matching techniques, domain specific heuristics, partitioning rules, themselves well-understood in the art, would be a suitable technique for this purpose. Each sub-problem may be further divided into sub-sub-problems, depending upon the nature of the domain.

Each sub-problem is subjected to at least one of a sub-problem solver (1d) and a sub-problem predictor (1e). The sub-problem solver generates an explicit solution (1f) to the sub-problem from which an evaluation (1g) is derived. The sub-problem predictor does not generate an explicit solution but instead predicts the evaluation that would occur were the sub-problem to be subjected to the sub-problem solver. These sub-problem evaluations, whether derived from explicit sub-problem solutions or predicted, are combined through some means (1h) to form an evaluation of the overall problem outcome (1i). A mechanism (1j) determines whether or not the decomposition formed in (1c) and the resulting solutions generated in (1f) represent a sufficient and acceptable solution to the original problem. If not, the process beginning with the decomposer is repeated at which point alternative decompositions may be generated. Otherwise, the process terminates.

Detailed optimization methods may be applied to some or all of the optimization sub-problems or their sub-problems. Predictive optimization methods that predict the outcome of the detailed optimization method which are of increased difficulty of solution may, similarly, be applied to some or all of the optimization sub-problems or their sub-problems. Solutions to the high-level optimization problem may thus be produced with fewer computational resources by substituting computationally inexpensive predictive methods for computationally expensive optimization methods.

Whichever way an evaluation is developed for the sub-problems, the sub-problem evaluations are composed at 1h and the "master" problem result or "pseudo-solution" (so-called since it may be partially predicted) thus derived may be evaluated at 1i. If this result is sufficient, as determined at 1j, the process may be terminated or repeated for a further decomposition or fully detailed solution.

There are many ways to build a predictor to approximate the outcome of optimization methods. Mathematical methods include the use of calculus and Taylor series approximation. Complex processes may require the construction of physical or mathematical models for simulation purposes. If the domain is very narrow and highly rule-based, expert systems may be viable. Classification methods such as decision-trees, neural-networks, nearest-neighbor methods, Bayesian methods, and polynomial classifiers are also possible.

Figure 2:
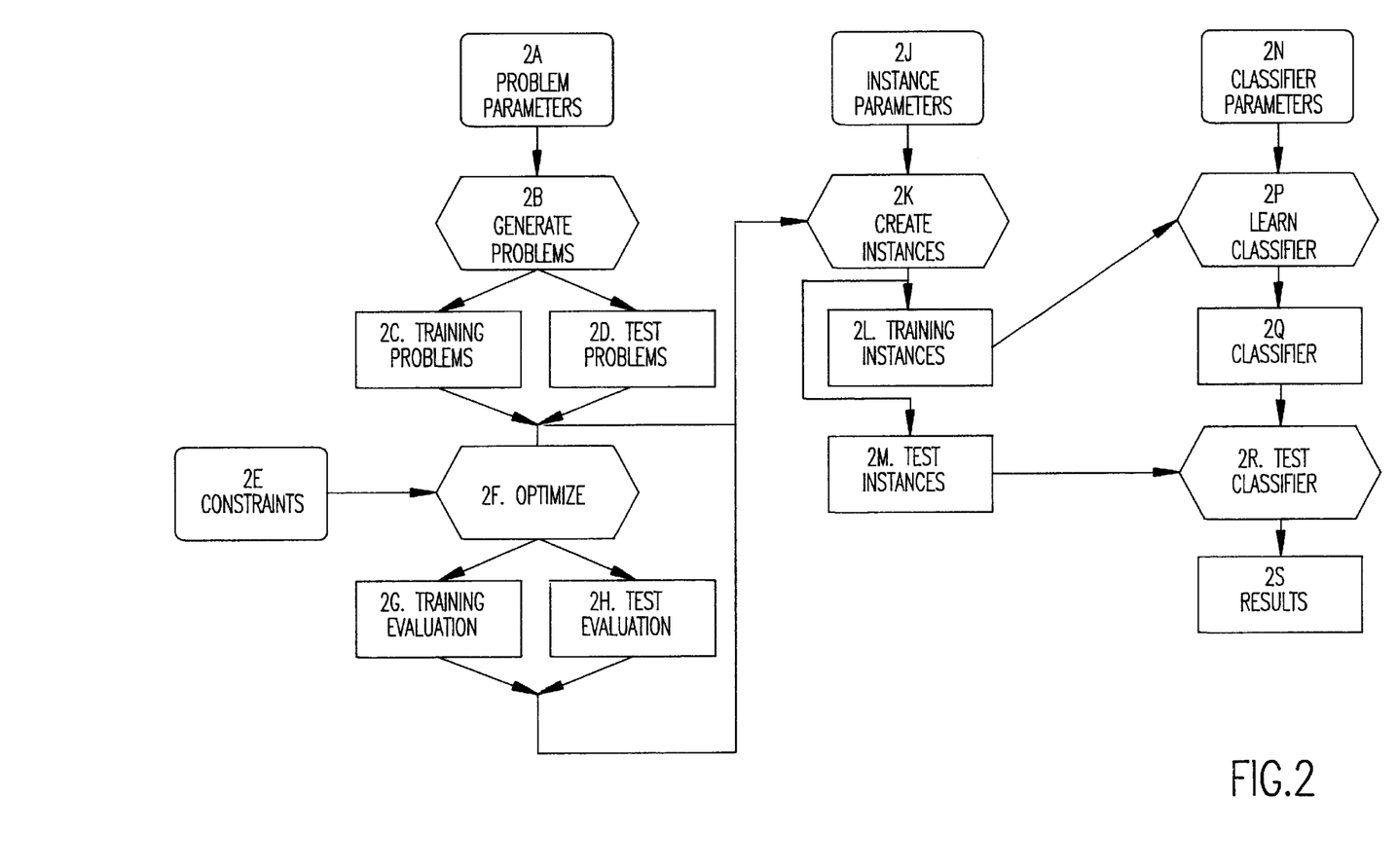

FIG. 2 depicts one specific methodology for constructing a predictor that can readily be implemented by anyone skilled in the art of computer programming. This methodology represents one possible technique for constructing a predictor that can be used as the basis for a predictive optimizer. It must be emphasized, however, that other equally valid predictor-generation schemes based on one or more of the aforementioned techniques are also possible. Problem parameters (2A) may consist of a set of attributes derived from randomly generated problems, or they may provide specifications for sampling a collection of historical problems stored in a database. The generation of problems (2B) involves creating a set of representative optimization problems based on these specifications, for example, by using historical data to define the basis for creating a random collection of orders with random specifications. The output is a collection of training problems (2C) used to construct the predictor and a distinct set of test problems (2D) used to test the performance and accuracy of the resultant predictor.

Each training and test problem is subject to detailed optimization (2F), resulting in solutions that are feasible with respect to certain problem specific constraints (2E). The outcome of each problem instance based on a detailed optimization (2G and 2H) is thus determined for each problem. These actual outcomes are eventually compared to the predicted outcome for purpose of testing the performance and accuracy of the resulting predictor. Relevant features of the representative problems are extracted. These features are combined (2K) with the classification of each problem to form training (2L) and test instances (2M). Instance parameters (2J) may provide guidance as to the number and type of features to be extracted. Training instances are used to create a predictor (2P). The predictor construction process may be subject to control parameters (2N). The resulting predictor (2Q) is tested (2R) to determine it's overall performance and accuracy (2S).

As indicated in FIG. 1, sub-problems may be subjected to prediction, exact solution methods, or both. A predictive optimizer is any method that substitutes prediction for optimization in whole or in part. A predictor evaluates a problem or sub-problem instance by categorizing the result into one of n possible outcomes, for $n \geq 2$. The predictor can be used to limit the number of sub-problems subjected to computationally expensive optimization methods that generate complete and explicit solutions.

For example, if an objective is to be maximized, then all sub-problem formulations whose predicted outcome is below some preset threshold can be discarded. All those formulations whose predicted outcome is above the threshold may be validated using detailed optimization methods. Thus a predictor can be used to explore the search space, while limiting the number of trials that must be solved at the level of the complete problem.

For example, let Q be the ratio of the time it takes to perform optimization with predictive optimization versus the time required without predictive optimization. Assume that the optimization search process encounters sub-problems that are rejected by the predictor with probability P in time t. When a sub-problem is not rejected by the predictor, the prediction is validated or invalidated by detailed optimization in time T. The total time spent to predict a good outcome and validate or invalidate the prediction is thus (t+T). Then, $$Q=(Pt+(1-P)(t+T))/T.$$

It follows that time will be saved in optimizing whenever $Q<1.0$, which occurs whenever $t/T<P$. This analysis assumes that the predictor is created once as part of the design and implementation of the predictive optimizer. In practice, it is possible to build a new predictor at run-time for each unique problem instance; in which case it becomes necessary to factor in the time it takes to actually construct the predictor before the resulting performance improvements can be assessed.

However, over the course of optimization, the value of P may be changing. For example, it may be the case that most initial sub-problems in a given decomposition result in predictably poor levels of optimization. Over time, more and more sub-problems in the decomposition are predicted to optimize well and are validated as such. If it is possible to reliably predict that the decomposition will produce low quality results if subject to exact methods that are more computationally expensive, then as depicted in FIG. 1, the solver can avoid the computational expense of generating an exact solution and can proceed immediately to searching for new and better decompositions whose predicted outcome is more favorable.

One method for accommodating changing values of P during the optimization process, is to periodically sample the sub-problems subject to prediction and optimization and compute an estimate of the current value of P (call it P') based on this sample. The predictor can then be disabled whenever it is found that t/T <P'. In other words, the invention provides for the use of prediction to quickly "weed-out" solutions to sub-problems which are not likely to lead to an optimal or near optimal solution and can determine, by any of a number of techniques and criteria, when it is likely that prediction will provide a benefit over detailed optimization of sub-problems and limit prediction to such circumstances.

Figure 3:
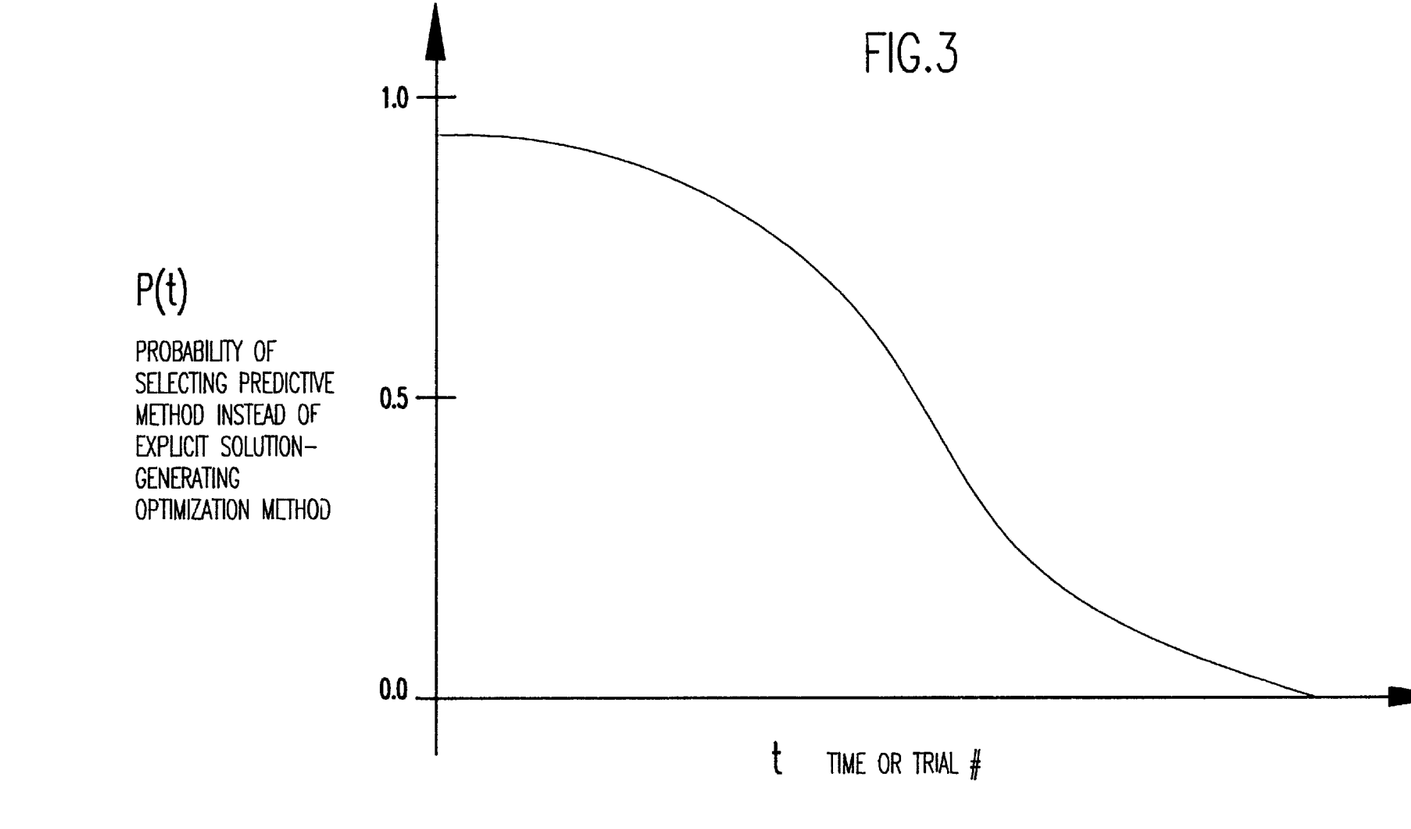

Another possible strategy for combining prediction methods with detailed optimization methods is to select use of a predictor in lieu of optimization with some probability, P, the value of which varies as a function of time or alternatively as a function of the number of sub-problem instances encountered. For example, FIG. 3 shows one possible function P(t) in which the predictive optimizer employs prediction less and less frequently as new sub-problem formulations are generated. A different function P' (t) would correspond to a different combination strategy and may produce significantly different results. The optimal strategy is domain and perhaps even problem specific but a sufficiently near-optimal strategy may, in any case, may be readily determined empirically without significant experimentation by comparison of results of different functions.

An optimal or near-optimal strategy by which predictors are combined with optimizers to create a "predictive optimizer" may need to take into account the fact that the predictive method depicted as (1e) in FIG. 1 may not be entirely accurate. For example, suppose detailed optimization is performed only when the classifier predicts a good outcome for validation purposes. If the system predicts a negative outcome incorrectly (false negatives) then this could interfere with the progress of optimization on the whole because the system will search unnecessarily for variant sub-problem formulations. Similarly, if the classifier makes false positive predictions that are then frequently invalidated by detailed optimization, the overhead of doing unnecessary classification could become significant. If such problems are encountered, however, other predictive methods noted above may be substituted.

To demonstrate the efficacy of the invention in the general case, suppose that in order to find a complete solution, N sub-problem formulations must be identified that optimize satisfactorily. A sub-problem is said to be "good" if a satisfactory solution for the problem can be found when the problem is subject to optimization. Let:

$P_g$=the probability that a given sub-problem is "good".
$A_{og}$=the probability that the optimizer will find a good solution for a good sub-problem.
$A_{ob}$=the probability that the optimizer will find a bad solution for a bad sub-problem.
$A_{cg}$=the accuracy of the classifier on good sub-problems.
$A_{cb}$=the accuracy of the classifier on bad sub-problems.
$T_o$=the average time it takes to optimize a given sub-problem
$T_c$=the average time it takes to make a prediction about the sub-problem.

Without using classification/predictors as a substitute for optimization, the expected number of sub-problems that we must subject to detailed optimization (X), and the total time required (T) is:

$$X = N/(P_g A_{cg})$$

$$T = XT_o = NT_o/(P_g A_{cg}).$$

Consider now the strategy in which sub-problems found to be bad are immediately rejected, while those predicted to be good are subject to detailed optimization in order to validate or invalidate the prediction:

$P_g(1-A_{cg})$ is the probability that a good solution is predicted to be bad. (No optimization occurs.)

$(1-P_g)A_{cb}$ is the probability that a bad problem is predicted to be bad. (No optimization occurs.)

$P_g A_{cg} A_{og}$ is the probability that a good solution is predicted to be good and then validated.

$P_g A_{cg}(1-A_{og})$ is the probability that a good solution is predicted to be good but then invalidated because of the optimizers failure to find a good solution.

$(1-P_g)(1-A_{cb})A_{ob}$ is the probability that a bad problem is predicted to be good and then invalidated.

It is never the case that bad problems are found through optimization to actually be good because then, by definition, they would not be bad problems. In other words, the accuracy of optimization on bad problems is 100%. ($A_{ob}=1$). The above expression thus reduces to $(1-P_g)(1-A_{cb})$.

Each time the classifier predicts a bad outcome, the total time spent is $T_c$. When the prediction is for a good outcome, detailed optimization will either validate or invalidate the prediction. In either case the total time spent is $(T_c+T_o)$. Using this strategy, the expected number of sub-problems that we must subject to classification and possibly detailed optimization ($X_{po}$), and the total time required ($T_{po}$) is:

$$T_{po} = (N/(P_g A_{cg} A_{og}))\{[P_g(1-A_{og})+(1-P_g)A_{og}]T_o+[P_g A_{cg} A_{og}+P_g A_{cg}(1-A_{og})+(1-P_g)(1-A_{ob})](T_c+T_o)\}$$

which simplifies to:

$$T_{po} = (N/(P_g A_{cg} A_{og}))\{[P_g(1-A_{og})+(1-P_g)A_{og}]T_o+[P_g A_{og}+(1-P_g)(1-A_{ob})](T_c+T_o)\}.$$

The designer of a predictive optimizer can use the above formula to determine whether or not a predictive optimization strategy will be beneficial. If $T_{po}<T$, then it is reasonable to expect that high-level optimization will be achieved in less time using predictive optimizers, despite the fact that the accuracy of prediction may be less than performing an actual optimization step. In general, we make no claims as to the optimal strategy for creating predictive optimizers as it depends both on the domain and on the nature and accuracy of the prediction and optimization techniques employed, and, as noted above, can be empirically determined.

As an example, and without loss of generality, we consider a paper manufacturing environment in which individual production runs are formed by batching together orders of a common product type. These batches or "runs" are subject to trim optimization which defines how reels produced on the main paper machine during the run are to be sliced into rolls to fulfill particular orders. One of the key objectives of trim optimization is to maximize trim efficiency (minimize unused portions of the reel.) The outcome of trim optimization depends upon how orders are batched together.

In searching for an optimal schedule that maximizes trim efficiency, it is necessary to search for the best batching alternatives. Trim optimization can provide feedback for this search process in the form of the evaluation of the trim solution itself, for example by using the average trim efficiency measured across all runs as the basis for assessing the quality of the run formulations. It will be noted, however, that the process of generating a trim solution for each run may be computationally expensive compared to a predictor that anticipates the outcome of trim optimization without generating a complete trimming solution.

The longer it takes to optimize a given batch or run, the longer it takes to compute overall average trim efficiency, and this, in turn, imposes a limit on the number of batches or runs that can be considered in a fixed amount of time. If, instead, the outcome of the trim optimization step is predicted based on attributes of the orders within that run, without actually performing the trim optimization itself, the feedback necessary to guide the search for the optimal solution can be provided in less time.

For example, a suitable algorithm for reallocating orders to different runs might identify orders in an existing run that are causing a simulated run to trim poorly. Fast prediction thus provides sufficient guidance to enable a high-level search process to consider more batch alternatives than would otherwise be possible. Depending upon the circumstances, this may make up for the fact that the predictor used to guide the search for the batches may be less accurate than actually performing detailed optimization.

A predictor is constructed that anticipates whether or not a given collection of orders with well defined attributes will trim efficiently (when subjected to some detailed optimization process.) The high-level optimizer searches for good batches (subject to certain constraints). The goal is to find a collection of batches that satisfy these constraints and whose overall trim efficiency (based on the trim efficiency of each batch) is maximal. We define an efficient trim as one in which the overall utilization of the input reels is greater than 99% (for example.) Alternatively, we may want to build a trim predictor that is more specific as to the outcome: (e.g., poor: 0%–85%, fair: 86%–90%, good: 90%–95%, excellent: 96%–100%). The details of the classifier's construction are not defined, and depend upon the problem domain, and the desired performance characteristics of the resulting classifier. A sample representative problem consists of a set of orders such as that given in the table below. Each order specifies the total number of rolls to be produced, and the size of each roll.

| Order | Rolls Minimum | Rolls Target | Rolls Maximum | Rollsize |
|---|---|---|---|---|
| 1 | 242 | 249 | 266 | 73.50" |
| 2 | 17 | 19 | 19 | 66.75" |
| 3 | 200 | 213 | 231 | 83.25" |
| 4 | 408 | 427 | 434 | 39.25" |
| 5 | 70 | 71 | 72 | 47.00" |
| 6 | 350 | 373 | 400 | 20.00" |
| 7 | 141 | 151 | 157 | 79.00" |

Figure 4:
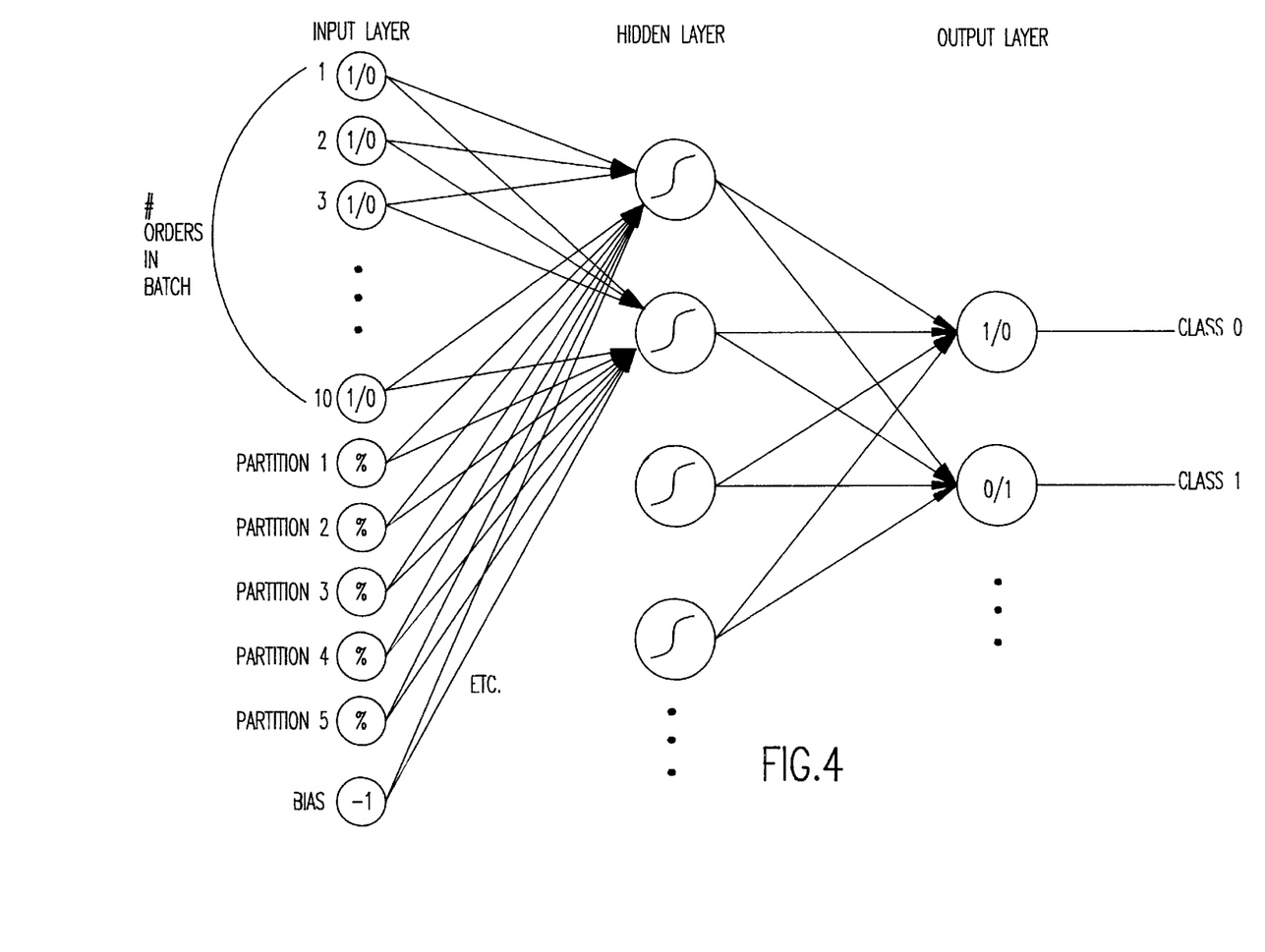

In real-world trim optimization, additional attributes and constraints may need to be considered. FIG. 4 depicts a neural network used to predict the outcome of this problem, were it to be subjected to a detailed trim optimization algorithm. Input nodes are turned on according to features of the input problem. Relevant features might include the number of orders in the set, the number of unique widths, and the distribution of different widths. The classification of the network corresponds to the output node with the highest value. The network is fully connected. The network can be trained using standard back-propagation techniques.

Figure 5:
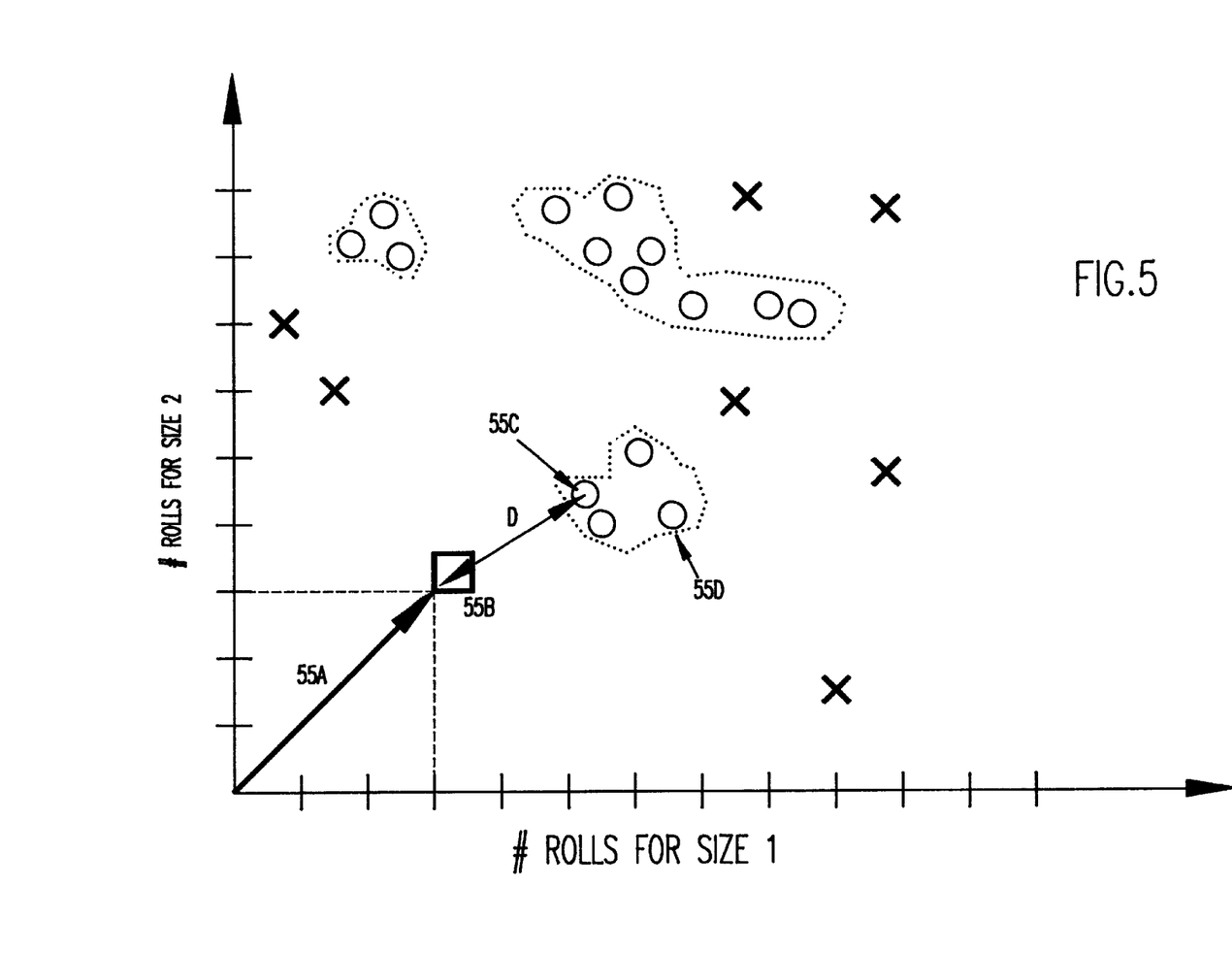

As previously mentioned, in addition to neural networks many other types of classifiers can be used as predictors of sub-problem optimization. Nearest-neighbor methods can be applied to trim prediction as follows. For example, as depicted in FIG. 5, each possible batch can be represented as a vector (55a) whose dimensionality is the number of unique Rollsize and whose elements are the number of rolls of each size to be made. If there are n unique Rollsize, then the vector represents a point (55b) in an n-dimensional space. The object is to find out whether this point is in a region that trims efficiently.

One strategy is to test many problems and map the outcome of each problem to the search space. In FIG. 5, an "X" represents a trim problem with a poor outcome and an "O" represents an outcome with a good outcome. For a new problem (55b) the geometric distance to the nearest problem instance is computed and the new problem is classified according to the classification of the nearest neighbor (55c). In FIG. 5, the point shown as (55c) is contained in a region filled with problems that provide for good outcomes (55d) but the spacial extent of such regions may be highly complex and difficult to identify as mathematical equations in closed form, for example. Those skilled in the art of constructing prediction methods will recognize that alternative strategies are possible. Another alternative is to require not only that the nearest neighbor be classified as good, but also that the distance (d) to the nearest-neighbor be less than some threshold.

Yet another alternative strategy is to first randomly generate a large number of efficient roll width combinations, also known as trim patterns; for example, reject any patterns with less than 99% efficiency. Each of these trim patterns can also be represented as an n-dimensional "trim vector" and thus is a point in the n-dimensional space that has high trim efficiency. Similarly, linear combinations of these good trim vectors can be randomly generated; each of these linear combinations, or "batch vectors" is also a point in space with good trim efficiency. Having generated a large number of these vectors once for the given set of rollsizes, we can use them whenever we need to predict the trim efficiency of a batch consisting of these rollsizes.

To do so, the list of good batch vectors is searched for the one that is closest to the batch vector being considered. If it lies within some threshold distance of one of the good vectors, it is experimentally observed that it will have good trim efficiency; otherwise it is assumed that it will not.

A useful feature of a nearest-neighbor predictor is that it can be easily used to guide the improvement of the decomposition. In other words, if a batch is predicted to trim poorly because of its large distance from a good batch vector, the batch can be modified to move its vector closer to one of the nearest good batch vectors.

There are also heuristic methods which can provide some additional predictive measure of trim efficiency. Two examples will be described here. The first method tests to see if the batch has sufficient diversity of Rollsize to support good trim efficiency. For example, suppose the maximum possible width of a trim pattern is 200 inches, and the batch consists of one order for 30 inch rolls. Clearly the best pattern possible consists of 6 such rolls, and has an efficiency of only 180/200=90%; the 30 inch order does not produce efficient trim solutions.

Furthermore, adding additional orders for sizes that are multiples of 30 inches, such as 60 inches or 90 inches will not improve trim efficiency. Therefore a test can be performed on the set of orders in a batch which measures the fraction of rolls or weight that are for sizes that are multiples of another size that does not self-trim. If the fraction is too large, it can be concluded that the batch will not trim well. A second method is useful for identifying a batch that will not trim well because it has too many orders for narrow rolls. There is frequently a restriction on the maximum number of rolls that can be made in a trim pattern.

For example, suppose the maximum pattern width is 200 inches and the maximum number of rolls that can be made in a pattern is 10. If a batch consists only of orders for 15 inch rolls, then the best possible pattern is 10 rolls of 15 inches each, with an efficiency of 150/200=75%. One can define a "narrow" rollsize as the maximum pattern width divided by the maximum number of rolls. Then a batch can be tested by calculating the fraction of rolls whose size is below the narrow rollsize; if this fraction is above some threshold, then it can be concluded that the batch will not trim well. These methods are useful in combination with the previous methods because they provide an indication of how to improve the batch.

The high-level optimizer forms initial batches. If they are predicted to trim well, this prediction is validated by doing detailed optimization. Otherwise, the batch is immediately rejected. The high-level optimizer modifies batches by performing various operations, including but not limited to: moving orders to a different batch, combining two batches, splitting a batch into two separate batches. Because many batches are rapidly rejected using prediction, more alternative batches can be considered in a given amount of time. The process is iterative because new batch formulations may be considered when existing batches fail to product good results.

In addition to the nearest-neighbor and neural network prediction methods described above, it should be understood that a variety of other techniques may be useful or even found to be preferable for specific applications. For example, rule-based methods, expert systems, network based classification methods including neural networks, perception classification, probabilistic networks, and approximation networks, memory-based systems including nearest-neighbor methods, Bayesian classification techniques, decision-tree, identification-tree induction or other induction heuristics, fuzzy-logic classification, Markov model induction, evolutionary programming techniques including genetic algorithms, simulated annealing, and/or ensemble classification techniques that may be found equally valid of even superior in some circumstances.

In view of the foregoing, it is seen that the invention provides for improved performance for finding optimal solutions by providing for the use of prediction methods as a substitute in whole or in part for exact methods. The invention provides for improved performance of a scheduling system for a industrial or manufacturing process in regard to both the number of possible alternatives that can be considered within an acceptable response time and the degree of optimization which can be provided for a given computational and hardware overhead by providing for use of prediction instead of detailed optimization when performance gains can be realized. Thus an increased variety of candidate solutions can be rapidly presented to a user by the system to increase the number of choices available and the quality of alternatives from which an acceptable solution can be selected.

While the invention has been described in terms of a single preferred embodiment, those skilled in the art will recognize that the invention can be practiced with modification within the spirit and scope of the appended claims.

Having thus described the invention, what is claimed as new and desired to be secured by Letters Patent is as follows:

1. A computer implemented scheduling optimization method for solving a scheduling problem in an industrial or manufacturing environment comprising the steps of:

(a) decomposing said scheduling optimization problem into a first plurality of sub-problems for the purpose of creating smaller, simpler problems that can be more easily evaluated and/or solved, the method of decomposition being dependent on a problem domain and problem parameters, (b) predicting an evaluation of a solution to at least one sub-problem creating at least one predicted evaluation for a sub-problem, (c) evaluating a composed solution of said scheduling optimization problem based on at least one of an evaluation of a solution and a predicted evaluation for each sub-problem, said composed solution including at least one said predicted evaluation, (d) repetitively performing steps (a), (b) and (c), each time forming a new plurality of sub-problems wherein at least one of said sub-problems of said new plurality of sub-problems differs from sub-problems of previously formed pluralities of sub-problems, (e) selecting, based on at least one of an evaluation of a solution and a predicted evaluation for each sub-problem, a decomposition for solution of said scheduling optimization problem, and (f) optimizing a schedule for an industrial or manufacturing process in accordance with a solution of a decomposition of said scheduling optimization problem.

2. A method as recited in claim 1, including the further step of solving each sub-problem into which said optimization problem is decomposed by said decomposing step or a repetition of said decomposing step.

3. A method as recited in claim 1, wherein said repetition of said decomposing step to form a new plurality of sub-problems is based on an evaluation which identifies a sub-problem for which a solution is predicted that is inconsistent with a solution to said optimization problem.

4. A method as recited in claim 1, wherein said repetition of said decomposing step to form a new plurality of sub-problems is based on an evaluation of a sub-problem of said first plurality of sub-problems.

5. A method as recited in claim 1, wherein said repetition of said decomposing step to form a new plurality of sub-problems is based on a random modification of said decomposition into said first plurality of sub-problems.

6. A method as recited in claim 1 wherein a prediction method employed in said step of predicting an evaluation includes a nearest neighbor method.

7. A method as recited in claim 1 wherein a prediction method employed in said step of predicting an evaluation includes a neural-network method.

8. A method as recited in claim 1 further including the step of combining two or more prediction methods into a single prediction method for enhanced performance or accuracy.

9. A method as recited in claim 1, further including a step of detailed optimization to validate classifier predictions.

10. A method as recited in claim 1 wherein at least one sub-problem corresponds to a downstream process in the context of a scheduling task.

11. A method as recited in claim 1 wherein at least one sub-problem corresponds to an upstream process in the context of a scheduling task.

* * * * *